W. L. BLISS.
CAR LIGHTING SYSTEM.
APPLICATION FILED MAR. 6, 1917.
1,351,328. Patented Sept. 7, 1920.
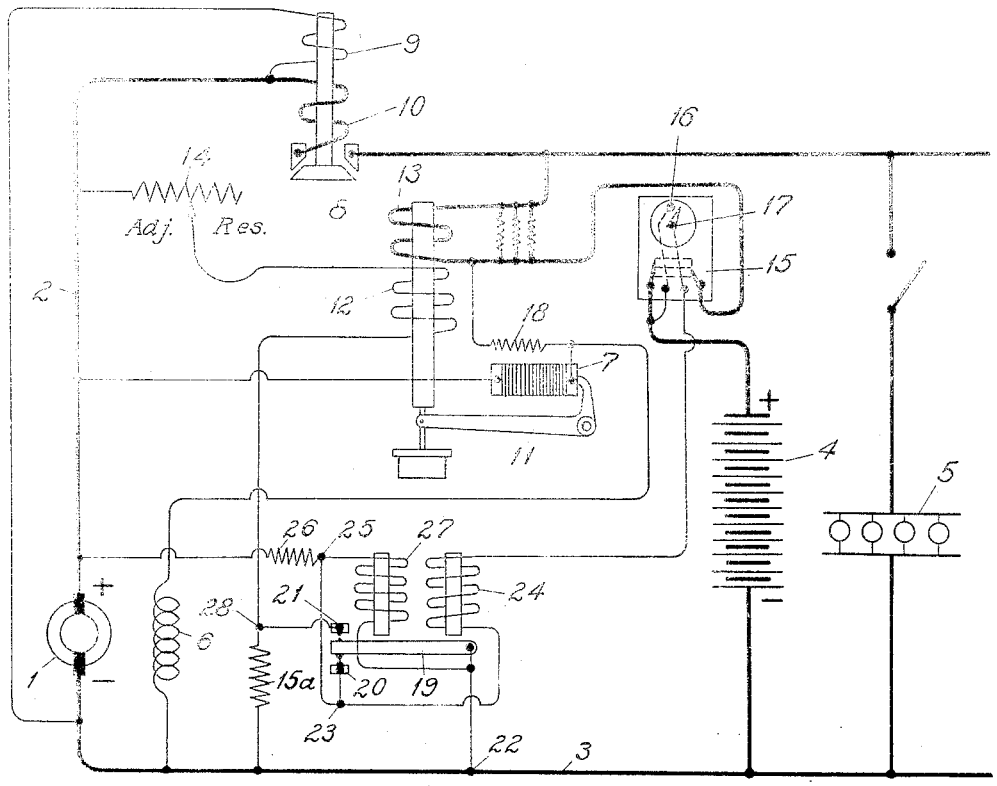
Witnesses
Jay E. Bronk.
Ralph Munden.
Inventor
William L. Bliss.
By Raymond H. Van Nest
Attorney

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

CAR-LIGHTING SYSTEM.

1,351,828.   Specification of Letters Patent.   Patented Sept. 7, 1920.

Application filed March 6, 1917. Serial No. 152,553.

*To all whom it may concern:*

Be it known that I, WILLIAM L. BLISS, a citizen of the United States, residing at Niagara Falls, in the county of Niagara and State of New York, have invented new and useful Improvements in Car-Lighting Systems, of which the following is a specification.

The present invention relates to car lighting systems.

More particularly the invention relates to systems involving a variable speed generator, a storage battery and a lamp circuit. When the generator is developing a sufficiently high voltage, it will supply the lamps and the storage battery in parallel. When the generator is at rest or is developing an insufficient voltage, it will be disconnected from the storage battery and lamps and the storage battery will supply the lamp demands.

In such systems it is desirable to provide some means to prevent the battery from being overcharged. The present invention relates to means whereby the battery may be properly charged and overcharge prevented.

One of the objects of the present invention is to provide a system in which the generator is provided with regulating means and means coöperating therewith for preventing the overcharge of the storage battery.

A further object is to provide a system having means responsive to the net charge delivered to the storage battery, having contacts which are engaged when full charge of the battery is indicated, and further means whereby arcing of said contacts will be prevented when said contacts are separated.

A further object is to provide a system having means responsive to the net input to the storage battery which are adapted to accomplish certain changes in said system, the restoration of the system to original conditions being dependent upon other devices.

Further objects will be apparent as the description proceeds.

The one figure of the drawing represents diagrammatically one embodiment of the present invention.

The armature of a variable speed generator is indicated by the numeral 1. Said armature supplies mains 2 and 3 across which is connected a circuit containing the storage battery 4 and another circuit containing the lamps 5. The armature 1 is provided with a field winding 6 which is connected across the armature brushes through the variable resistance 7. Located in one of the mains is the automatic switch 8. This automatic switch 8 may be of any preferred construction. It is illustrated as being provided with the usual lifting coil 9 and the usual holding coil 10. When the generator is developing a sufficiently high voltage, the automatic switch 8 will be closed. When such voltage is not being developed by the generator, the automatic switch will be open.

The variable resistance 7, in circuit with the shunt field, is represented as a compressible pile. Said compressible pile is controlled by a bell crank lever 11, which is controlled by a pair of coils 12 and 13. Coil 12 is connected across the generator brushes to be responsive to the voltage developed thereon. The circuit of the coil 12 includes the adjustable resistance 14 and the resistance $15^a$. The coil 13 is connected in the storage battery branch in series with the measuring device 15. The measuring device 15 will measure the net input to the storage battery 4. Preferably, it will take the form of an ampere hour meter. This meter may be of any preferred construction, but should be of the type which automatically changes its rate of registration upon change of the direction of current flow therethrough. Such a meter may be calibrated to compensate for battery losses, whereby at all times to indicate the available charge remaining in the storage battery. The ampere hour meter is provided with a stationary contact 16 and a movable pointer 17. Said pointer is adapted to engage with said contact for a purpose which will be described hereinafter. A resistance 18 may be provided between the positive terminal of the storage battery and the field circuit, as shown in the drawing, whereby to provide a path of relatively high resistance for furnishing exciting current for the generator when said generator is starting up. A controlling switch is indicated by the numeral 19. This switch is normally biased to its lowermost position, as shown in the drawing. The switch 19 is adapted to engage, under certain conditions, with the contact 20, and under certain other conditions, to engage with contact 21. The switch 19 is connected to the binding post 22 in the main 3. The contact 21 is connected through the resistance $15^a$ to the main 3. Said contact 21 is also connected to one end of the coil 12. The contact 20 is connected to the binding post 23, which is connected to one end of the coil 24 and also to the binding post 25. The binding post 25 is connected to the positive brush of the generator through the resistance 26 and also to one end of the coil 27. The other end of the coil 27 is connected to the binding post 22. The other end of the coil 24 is connected to the movable pointer 17 of the ampere hour meter. Contact 21 is connected to the binding post 28, which is connected through the resistance 15ª to the main 3 and also to one terminal of the coil 12.

A mode of operation of the above described embodiment of the present invention is substantially as follows:

With the generator at rest or developing a low voltage, the storage battery will supply the lamp demands, all withdrawals of current from the storage battery being registered by the ampere hour meter 15. When the train starts up and the armature 1 is developing a voltage sufficient to close the automatic switch, said armature will supply current to the mains 2 and 3, furnishing current for the lamps and also charging the storage battery. Preferably, the coil 12, which is connected across the armature brushes, will so control the resistance 7 as to cause the armature 1 to develop a substantially constant voltage, regardless of fluctuations in speed and lamp demands. If the battery should be in a discharged condition, whereby an excessively high current would tend to flow therethrough, the coil 13, which is connected in the battery branch, will so modify the operation of the resistance 7 as to prevent such an excessive charging current. At this time, when less than the full charge is indicated in the storage battery, the ampere hour meter contacts will be open and the switch 19 will be in its lowermost or biased position.

When the pointer 17 of the ampere hour meter 15 connects with the fixed contact 16, as when a complete charge for the storage battery has been indicated, a circuit will be completed from the positive side of the storage battery through the ampere hour meter contacts, through coil 24, contact 20, switch 19, binding post 22, back to the negative side of the storage battery. Energization of the coil 24 will result in raising the switch 19, thus breaking contact between switch 19 and contact 20. Inasmuch as the switch 19, when in its lowermost position, forms a short circuit for the coil 27, it will be evident that the raising of the switch 19 simultaneously opens the circuit to the coil 24 and removes the short circuit around coil 27, whereby at the same instant, the coil 24 is disabled and the coil 27 is rendered operative. Breaking contact between switch 19 and contact 20, it will be noted, opens the circuit through the contacts 16 and 17 of the meter 15. The coil 27 will now receive current from the positive brush of the generator through resistance 26, to the binding post 22, to the negative side of the generator and will maintain the switch 19 in its uppermost position in contact with contact 21. It will be noted that in its uppermost position the switch 19 short circuits resistance 15ª. Inasmuch as the resistance 15ª is now short-circuited, the coil 12 will be more effective in controlling the resistance 7 and will now cut down the energization of the generator. The circuit of the coil 12 may be so designed that said coil 12 will reduce the energization of the generator field circuit to the desired value, which may be the floating voltage of the storage battery. After this time the generator will be developing the proper voltage for supplying the lamps 5, whereby the storage battery may float across the mains.

Inasmuch as the circuit through the contacts 16 and 17 of the meter 15 was opened by the raising of the switch 19, no arc will now be drawn across said contacts when they separate. Destruction of the meter contacts is therefore prevented. As long as a predetermined voltage is being developed across armature terminals, the coil 27 will hold the switch 19 in its uppermost position. When the generator voltage falls below said predetermined value, as for instance, when the train slows down materially, the coil 27 will permit switch 19 to return to its biased or lowermost position, thus restoring the parts to the positions indicated in the drawing.

One embodiment of the present invention has been described in detail. Many modifications will occur to those skilled in the art. It is intended that the patent shall include all such modifications that fall within the scope of the invention as defined by the appended claims.

What I claim as new and desire to secure by Letters Patent of the United States is:—

1. In an electrical system, in combination, a variable speed generator, a storage battery, means for measuring the net input to said storage battery, regulating means for said generator, a controlling circuit for said regulating means, and a second controlling circuit responsive to said measuring means, said second circuit being adapted to simultaneously break its own circuit and render the first mentioned circuit operative.

2. In an electrical system, in combination, a variable speed generator, a storage battery, means for measuring the net input to said battery, said measuring means being provided with engaging contacts, a controlling circuit adapted to be completed by said contacts, and a second controlling circuit, said first mentioned controlling circuit being adapted to simultaneously break circuit through said contacts and to render said second controlling circuit operative.

3. In an electrical system, in combination, a variable speed generator, a storage battery, means for measuring the net input to said storage battery, regulating means for said generator, a controlling circuit for said regulating means and a second controlling circuit responsive to said measuring means, said second circuit being adapted to break its own circuit and to render the first mentioned circuit operative.

4. In an electrical system, in combination, a variable speed generator, a storage battery, means for measuring the net input to said battery, said means being provided with contacts adapted to engage, regulating means for said generator, a controlling circuit for said regulating means, and a second controlling circuit adapted to be completed by said contacts, said second circuit being adapted to simultaneously render said first mentioned circuit operative and break circuit through said contacts.

5. In an electrical system, in combination, a variable speed generator, a storage battery, a lamp circuit, means for regulating said generator whereby its voltage is substantially unaffected by changes in speed or lamp load, means for measuring the net input to said battery, means responsive to said measuring means for reducing the generator voltage to substantially the floating voltage of said battery, and means for maintaining said floating voltage independently of said measuring means.

6. In combination, a variable speed generator, a storage battery, means for regulating the voltage developed by said generator, means having engaging contacts for varying the operation of said regulating means when said contacts engage, a coil whose circuit is adapted to be closed by said contacts, a switch adapted to be operated by said coil, said switch and a second coil adapted to maintain said switch in operated position, said switch being adapted to simultaneously break circuit through said first coil and render said maintaining coil operative.

7. In combination, a variable speed generator, a storage battery, means for measuring the input to said storage battery, said measuring means being provided with contacts adapted to engage, a switch, an operating coil for said switch adapted to be energized when said contacts engage, and a maintaining coil for said switch adapted to be rendered operative by the operation of said switch operating coil, said switch being adapted to break the circuit of said contacts when moved to operated position.

8. In combination, a variable speed generator, a storage battery, a pair of contacts adapted to be engaged, a switch, an operating coil for said switch adapted to be energized when said contacts engage, and a maintaining coil for said switch adapted to be rendered operative by the operation of said switch, said switch being adapted to break the circuit of said contacts when moved to operative position.

9. In combination, a variable speed generator, a storage battery, means responsive to the net charge delivered to said battery, said means being provided with contacts, a switch, an operating coil for said switch controlled by said contacts, a maintaining coil for said switch, said switch being adapted to break circuit through said contacts and at the same instant render operative the maintaining coil.

10. In combination, a variable speed generator, a storage battery, means responsive to a function of the system, said means being provided with contacts, a switch, an operating coil for said switch controlled by said contacts, a maintaining coil for said switch, said switch being adapted to break circuit through said contacts and at the same instant render operative the maintaining coil.

11. In an electrical system, in combination, a variable speed generator, a storage battery, means for measuring the net input to said storage battery, regulating means for said generator, a controlling circuit for said regulating means, and a second controlling circuit responsive to said measuring means, said second circuit being adapted to simultaneously break its own circuit and render the first mentioned circuit more effective.

In witness whereof I have hereunto subscribed my name.

WILLIAM L. BLISS.